United States Patent
Young et al.

(10) Patent No.: US 8,578,001 B2
(45) Date of Patent: Nov. 5, 2013

(54) SMART ENERGY GATEWAY WITH INTEGRATED PLUG

(75) Inventors: Joel K. Young, Eden Prairie, MN (US); Mark Tekippe, Story City, IA (US)

(73) Assignee: Digi International Inc., Minnetonka, MN (US)

(*) Notice: Subject to any disclaimer, the term of this patent is extended or adjusted under 35 U.S.C. 154(b) by 255 days.

(21) Appl. No.: 12/823,333

(22) Filed: Jun. 25, 2010

(65) Prior Publication Data
US 2011/0320636 A1    Dec. 29, 2011

(51) Int. Cl.
G06F 15/177    (2006.01)

(52) U.S. Cl.
USPC .......................................................... 709/220

(58) Field of Classification Search
USPC .......................................................... 709/220
See application file for complete search history.

(56) References Cited

U.S. PATENT DOCUMENTS

| | | | |
|---|---|---|---|
| 4,462,113 A | 7/1984 | Iwata | |
| 5,237,663 A | 8/1993 | Srinivasan | |
| 5,564,070 A * | 10/1996 | Want et al. | 455/507 |
| 5,628,055 A * | 5/1997 | Stein | 455/575.1 |
| 5,838,226 A | 11/1998 | Houggy et al. | |
| 5,954,817 A | 9/1999 | Janssen et al. | |
| 6,131,040 A | 10/2000 | Knuutila et al. | |
| 6,175,860 B1 | 1/2001 | Gaucher | |
| 6,509,913 B2 | 1/2003 | Martin, Jr. et al. | |
| 6,728,531 B1 | 4/2004 | Lee et al. | |
| 6,748,278 B1 | 6/2004 | Maymudes | |
| 7,463,877 B2 | 12/2008 | Iwamura | |
| 7,463,907 B2 * | 12/2008 | Smith et al. | 455/562.1 |
| 7,486,648 B1 | 2/2009 | Baranowski | |
| 7,853,221 B2 | 12/2010 | Rodriguez et al. | |
| 7,941,530 B2 * | 5/2011 | Ha et al. | 709/224 |
| 8,041,369 B2 | 10/2011 | Smith et al. | |
| 8,391,496 B2 * | 3/2013 | Young | 380/279 |
| 2002/0068558 A1 | 6/2002 | Janik | |
| 2003/0198208 A1 | 10/2003 | Koos, Jr. et al. | |
| 2004/0174900 A1 | 9/2004 | Volpi | |
| 2004/0212500 A1 | 10/2004 | Stilp | |
| 2004/0235468 A1 | 11/2004 | Luebke et al. | |
| 2004/0253945 A1 | 12/2004 | Janik | |
| 2005/0136972 A1 | 6/2005 | Smith et al. | |
| 2005/0271128 A1 | 12/2005 | Williams et al. | |
| 2006/0104291 A1 | 5/2006 | Rodriguez et al. | |
| 2006/0159048 A1 * | 7/2006 | Han et al. | 370/331 |

(Continued)

FOREIGN PATENT DOCUMENTS

| | | | |
|---|---|---|---|
| WO | WO-03/047122 A1 | 6/2003 | |
| WO | WO-2009/005807 A1 | 1/2009 | |

OTHER PUBLICATIONS

"U.S. Appl. No. 11/773,266, Non-Final Office Action mailed Sep. 20, 2010", 17 pgs.

(Continued)

*Primary Examiner* — Alicia Baturay
(74) *Attorney, Agent, or Firm* — Fogg & Powers LLC

(57) ABSTRACT

Various embodiments include a smart energy gateway. The smart energy gateway includes a housing and a power plug integrated into the housing. The smart energy gateway can be mounted to an electrical outlet via the power plug. The smart energy gateway also includes a controller configured to accept transmissions from a smart energy network and communicate a subset of the transmissions to an external network. Other devices and methods are disclosed.

37 Claims, 6 Drawing Sheets

(56) References Cited

U.S. PATENT DOCUMENTS

| | | | |
|---|---|---|---|
| 2006/0187023 A1 | 8/2006 | Iwamura | |
| 2007/0197262 A1 | 8/2007 | Smith et al. | |
| 2007/0293208 A1 | 12/2007 | Loh et al. | |
| 2008/0057931 A1 | 3/2008 | Nass et al. | |
| 2008/0278327 A1 | 11/2008 | Nierenberg et al. | |
| 2009/0010178 A1 | 1/2009 | Tekippe | |
| 2009/0140861 A1 | 6/2009 | Caliri et al. | |
| 2009/0146833 A1* | 6/2009 | Lee et al. | 340/825.52 |
| 2009/0174569 A1 | 7/2009 | Smith et al. | |
| 2009/0298490 A9 | 12/2009 | Janik | |
| 2010/0130142 A1 | 5/2010 | Schubert | |
| 2010/0232400 A1 | 9/2010 | Patil et al. | |
| 2010/0312430 A1* | 12/2010 | Troncoso et al. | 701/29 |
| 2011/0022242 A1* | 1/2011 | Bukhin et al. | 700/291 |
| 2011/0084809 A1 | 4/2011 | Perkins | |
| 2011/0287757 A1 | 11/2011 | Nykoluk et al. | |
| 2011/0298301 A1 | 12/2011 | Wong et al. | |
| 2011/0299684 A1* | 12/2011 | Young | 380/264 |
| 2011/0302190 A1* | 12/2011 | Young | 707/769 |
| 2011/0316717 A1* | 12/2011 | Young et al. | 340/870.07 |
| 2012/0066332 A1* | 3/2012 | Deprun | 709/206 |
| 2012/0072549 A1* | 3/2012 | Deprun | 709/219 |
| 2012/0102161 A1* | 4/2012 | Deprun | 709/220 |
| 2012/0221718 A1* | 8/2012 | Imes et al. | 709/224 |

OTHER PUBLICATIONS

"U.S. Appl. No. 11/773,266, Final Office Action mailed Mar. 23, 2011", 19 pgs.

"U.S. Appl. No. 11/773,266, Response filed Dec. 20, 2010 to Non Final Office Action mailed Sep. 20, 2010", 12 pgs.

"European Application Serial No. 08779932.6, Office Action mailed Feb. 10, 2011", 6 pgs.

"European Application Serial No. 08779932.6, Office Action mailed Jun. 1, 2010", 7 pgs.

"European Application Serial No. 08779932.6, Office Action Response Filed Sep. 14, 2010", 4 pgs.

"International Application No. PCT/US2008/008207, International Preliminary Report on Patentability", (Jan. 14, 2010), 10 pgs.

"International Application Serial No. PCT/US2008/008207, International Search Report Mailed on Nov. 25, 2008".

"International Application Serial No. PCT/US2008/008207, International Written Opinion Mailed on Nov. 25, 2008".

"LZR01 D01 ZigBee Router—Logitech (Taiwan)", http://www.logi.com.tw/index_files/Page695.htm, (Unknown; prior to May 7, 2007), 1 page.

Gutierrez, J. A, et al., "IEEE 802.15.4:Developing Standard for Low-Power Low-cost Wireless Personal area Networks", IEEE Network, IEEE Service Center, (Sep. 1, 2001), pp. 12-19.

Jin-Shyan L, et al., "ITRI Zbnode : A Zig Bee /IEEE 802.15.4 Platform For Wireless Networks", System, Man and Cybernetics, (Oct. 1, 2006), pp. 1462-1467.

Lee, Jin-Shyan, et al., "ITRI ZBnode: A ZigBee/IEEE 802.15.4 Platform for Wireless Sensor Networks", IEEE International Conference on Systems, Man and Cybernetics, 2006. SMC '06, vol. 2, (2006), 1462-1467.

"U.S. Appl. No. 12/895,903, Non Final Office Action mailed Aug. 24, 2012", 14 pgs.

"European Application Serial No. 11183626.8, Response filed Oct. 4, 2012 to Extended Search Report mailed Feb. 1, 2012", 12 pgs.

* cited by examiner

SMART ENERGY GATEWAY WITH INTEGRATED PLUG

TECHNICAL FIELD

This document pertains generally to devices that communicate via a network, and more particularly, but not by way of limitation, to a smart energy network gateway to an external network.

BACKGROUND

Smart energy ("SE") devices and networks have been deployed in homes and businesses as utilities and consumers attempt to better understand and control energy use. SE networks are typically a collection of monitoring, control, and reporting devices located, for example, in a home. Typical SE devices include, for example, thermostats and water, gas, and electric meters. The SE devices generally implement one or more communications protocols to communicate with each other and ultimately the utility or consumer.

Network devices, such as those on the SE network, may attempt to communicate with devices on a different, or external, network. The external network may be different than the SE network, such as implementing a different communications protocol or addressing scheme. To facilitate these communications, a gateway may be used to interface between the SE network and the external network. The gateway may be a node on the SE network and may include the appropriate hardware and software to connect to both the SE network and the external network, as well as the appropriate hardware and software to route communications between the two networks.

The SE devices on a SE network may be interconnected in various ways but are often connected, at least in part, wirelessly. The SE devices may communicate data using radio frequency ("RF") signals. One way the SE devices may be organized is as a mesh network. A mesh network may allow one node to communicate with another node using multiple hops through peer nodes on the network instead of transmitting data exclusively through a dedicated network infrastructure device, such as a switch, which may then forward the data directly to the recipient node. Mesh network nodes may be able to dynamically reconfigure communication paths around blocked or malfunctioning nodes. A wireless mesh network may be a wireless ad hoc mesh network, meaning that it is self-configuring. As such, the network topology of the ad hoc mesh network may change rapidly.

The wireless mesh network may be a wireless personal area network ("WPAN"). WPANs tend to be used for general purpose, inexpensive, mesh networks such as, for example, industrial control or home automation. An example of a WPAN is a ZigBee wireless network. A ZigBee wireless network implements the IEEE 802.15.4 communication protocol standard for WPANs. WPAN node devices are typically low power [e.g., 1 milliwatt (mW) to 250 mW] and have lower data rates [e.g., 250 kilobits per second (kbps)] than node devices for other networks.

WPAN node devices are typically powered by either an external power brick requiring a power cord or are powered by batteries. WPAN node devices having an external power brick are bulky and may make a WPAN less convenient to implement. Such WPAN node devices often require additional mounting hardware or a special installation which can be expensive and cumbersome.

A WPAN implemented using battery powered node devices tries to conserve power and extend the life of the batteries of the individual nodes. To extend the battery life of battery-powered nodes in WPAN applications, the nodes may be required to enter a very low power mode for most of the time that the network is operating, which results in decreased throughput. Periods of high network traffic can quickly drain batteries. Furthermore, when batteries reach the end of their life, battery powered nodes require more maintenance and pose a higher risk of network failure.

OVERVIEW

In a smart energy ("SE") gateway it can be advantageous for the SE gateway to integrate its power plug into its housing in order to mount the SE gateway to an electrical outlet. The SE gateway may also include a controller configured to accept transmissions from the SE network and communicate a subset of those transmissions to the external network. The integrated plug may allow the SE gateway to be conveniently located to provide access to power as well as effective coupling to both the SE network and the external network. This document provides numerous examples in the detailed description, an overview of which is provided here.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Creating effective SE networks may involve placing network nodes in locations conducive to communicating with other network nodes. In a wireless network, this may involve placing nodes closely enough to other nodes such that RF signals between nodes are received with sufficient integrity. In wireless networks, the power of a given node's transmitter may impact the distance its transmissions may be effectively received. Other factors, however, such as building materials at the SE network site, may also impact the desired positioning of a node. In a wireless mesh network, node placement may also account for node densities to provide alternative network paths in case some nodes fail.

When a SE network node is a gateway an additional consideration impacts the positioning of the node, namely, access to the gateway's external network interface. For example, if the external network is accessed via Ethernet, then proximity to an appropriate Ethernet port may be desired. Because the placement of nodes depends on several factors, convenience in installing an SE gateway helps to mitigate some of the difficulty in creating effective SE networks. Integrating a plug into the SE gateway may provide for easy installation at any electrical outlet without additional hardware or labor, as well as provide ample power to increase its effective transmission range.

Figure 1:
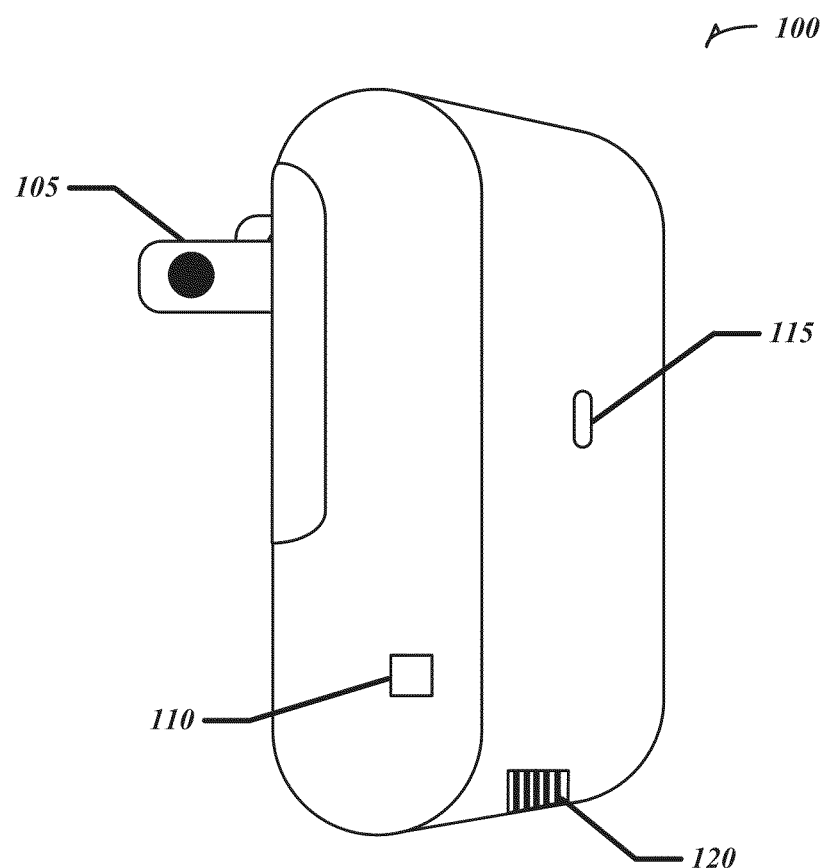
FIG. 1 illustrates an example SE gateway.

FIG. 1 illustrates an example SE gateway 100. In some embodiments the SE gateway 100 may be a part of a SE network. In some embodiments the SE gateway 100 may be used to implement an ad hoc mesh network. In some embodiments the SE gateway 100 may be a node on a mesh network. The mesh network can be a WPAN. Examples of a WPAN include, without limitation, a ZigBee protocol wireless network or any network using the IEEE 802.15.4 communication protocol standard for WPANs. Implementation of other mesh network protocols is within the scope of this document.

The SE gateway 100 may include power plug 105 to mount the SE gateway 100 to an electrical outlet. The SE gateway 100 may include an external antenna connector 110. The SE gateway 100 may also include one or more light emitting diodes ("LEDs") 115. Additionally, the SE gateway 100 may include one or more external connectors 120. An example external connector 120 may be an Ethernet jack, or serial connection such as a Universal Serial Bus ("USB") plug.

The SE gateway 100 may not have an external power brick giving it a very compact form factor. Containing the SE gateway 100 within a single enclosure may improve its reliability by avoiding the accidental removal of the power brick or accidents, including power loss, resulting from a dangling power cord.

In some embodiments the power plug 105 is interchangeable, which may allow the power plug 105 to be interchanged with power plugs of different standards, such as U.S. standard, U.K. standard, E.U. standard, Japan standard, and Australia standard plugs. The SE gateway 100 may also include a universal power supply circuit able to operate at a variety of electrical outlet voltages. This may allow a single type of SE gateway 100 to be distributed internationally for deployment of SE networks in a variety of countries.

Figure 2A:
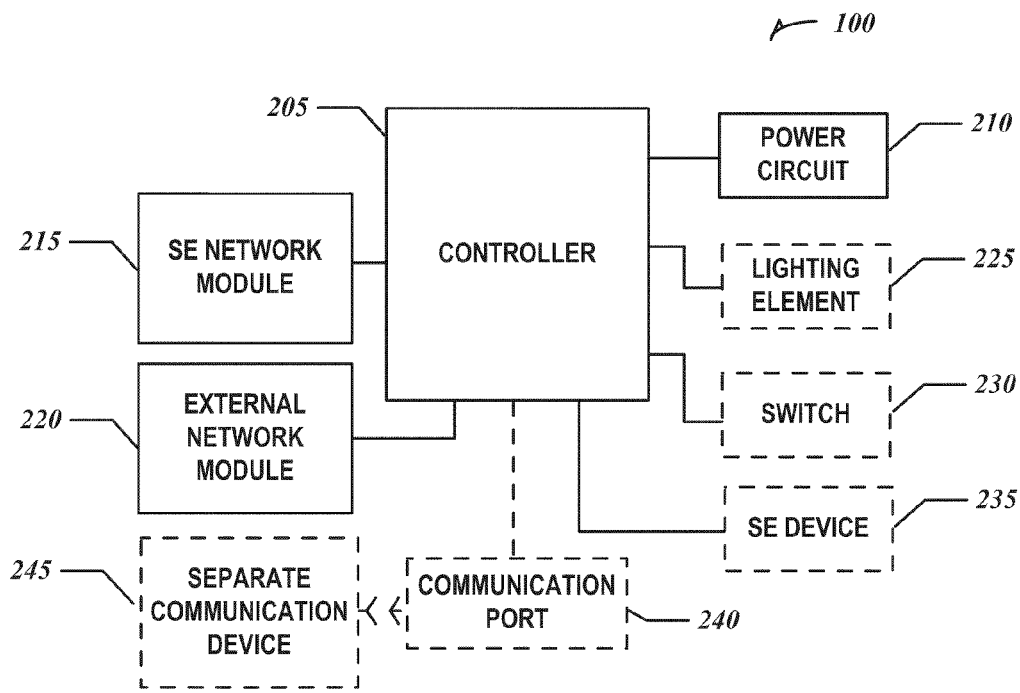
FIG. 2a illustrates a block diagram of components of an example SE gateway.

FIG. 2a illustrates a block diagram of components of an example SE gateway. The SE gateway 100 may include a controller 205, a power circuit 210, an SE network module 215, and an external network module 220. In some embodiments the SE gateway 100 may additionally include one or more of the following: a lighting element 225, a switch 230, a SE device 235, and a communication port 240 to communicate with a separate communication device 245.

Figure 2B:
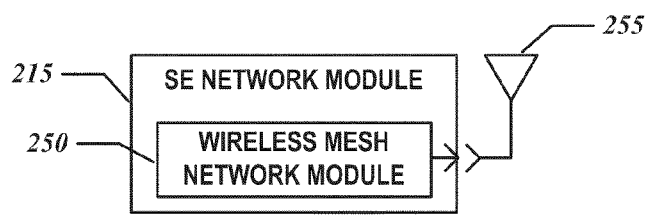
FIG. 2b illustrates a block diagram of components of an example SE network module.

The SE network module 215 may be implemented in hardware, software, firmware, or any combination of the three. It may provide both the physical and logical connection from the SE gateway 100 to the SE network. FIG. 2b illustrates a block diagram of components of an example SE network module 215 in some embodiments, which may include a wireless mesh network module 250 coupled to an antenna 255. In some embodiments the antenna 255 may be internal to a housing of the SE gateway 100. An internal antenna may simplify deployment of the SE gateway 100 and improve reliability by protecting the antenna 255 within the housing.

In other embodiments, the antenna 255 may be external to the housing of the SE gateway 100 and coupled to the wireless mesh network module 250 via, for example, the external antenna connector 110 shown on FIG. 1. Using an external antenna may increase the RF range of the SE gateway 100.

Figure 2C:
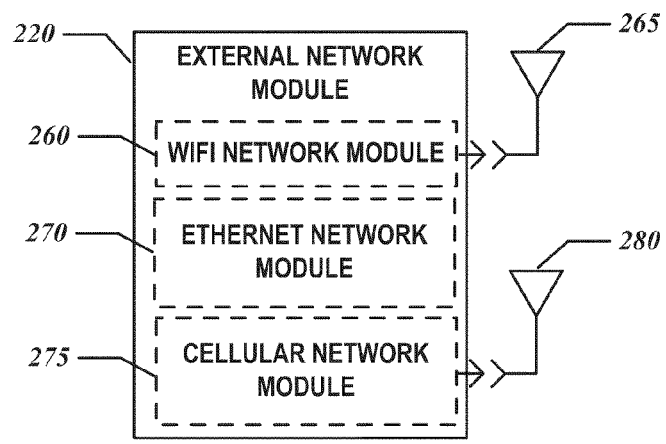
FIG. 2c illustrates a block diagram of components of an example external network module

The external network module 220 may be implemented in hardware, software, firmware, or any combination of the three. It may provide both the physical and logical connection from the SE gateway 100 to the external network. The external network may implement a number of communications protocols at various levels of the network stack. For example, the external network may implement TCP/IP over Ethernet. In some embodiments the external network may be a WiFi wireless network, an Ethernet network, or a cellular network (e.g., GSM, CDMA, and GPRS among others). FIG. 2c illustrates a block diagram of components of an example external network module 220 in some embodiments. The external network module 220 may include one or more of the following: a WiFi network module 260, an Ethernet network module 270, and a cellular network module 275. The Ethernet network module 270 may be coupled to an Ethernet jack in the SE gateway 100. The WiFi network module 260 may be coupled to an antenna 265. The cellular network module 275 may also be coupled to an antenna 280. Antennas 265 and 280 may be either internal or external to a housing of the SE gateway 100. In some embodiments a single antenna may be used for two or more of the wireless mesh network module 250, the WiFi network module 260, and the cellular network module 275. Other possible external network modules and connection hardware are also contemplated, such as USB or IEEE 1394 based networks.

The controller 205 may be implemented using hardware, firmware, software or any combination of the three. Example hardware may include a microcontroller, a logical state machine, and a processor such as a microprocessor, application specific integrated circuit (ASIC), or other type of processor. The controller 205 may be configured to perform or execute a function or functions. Such functions correspond to modules, which are software, hardware, firmware or any combination thereof. Multiple functions may be performed in one or more modules.

The controller 205, the SE network module 215, and the external network module 220 may perform the gateway functions of the SE gateway 100. For example, the SE network module 215 may receive packets of information from a SE device in the SE network addressed to a device on the external network. The controller 205 may then transmit those packets, using the external network module 220, to the destination device.

In some embodiments the SE gateway 100 may route information between nodes of the SE network. If the SE network is a wireless network, the controller 205 and the SE network module 215 may perform the addressing and routing functions of a wireless router. For example, the controller 205 and the SE network module 215 may route packets of information using the IEEE 802.15.4 communication protocol. As a wireless router, the SE gateway 100 may be able to extend or improve a wireless mesh based SE network.

To facilitate deploying the SE gateway 100 and configuring it to connect to the SE network and the external network, the SE gateway 100 may provide several levels of indication as to its status. In some embodiments the controller 205 is configured to initiate a status indication when the SE gateway 100 is mounted to an electrical outlet to provide power to the power circuit 210. The controller 205 may also initiate a status indication when the controller 205 joins, or is otherwise associated with, the SE network. Joining the SE network may include the SE gateway 100 being assigned an address for the SE network. In some embodiments joining the SE network may involve active participation in the SE network. For example, if the SE network is a wireless mesh network, then the SE gateway 100 may become an active node in the wireless mesh network, transmitting and receiving information to other nodes including routing data between nodes. Another status indication may be initiated from the controller 205 when the controller 205 joins the external network. Again, joining the external network may include the SE gateway 100 being assigned an address for the external network and becoming an active participant of the external network.

The status indication may be a physical indication or a logical indication. A physical indication may provide an indication of SE gateway 100 status information to someone near the SE gateway 100. In some embodiments the SE gateway 100 may include a light emitting element 225. In some embodiments the light emitting element 225 may include one or more light emitting diodes ("LED") of various colors, such as the LEDs 115 shown on FIG. 1. The controller 205 may use the lighting element 225 to indicate the status information of the SE gateway 100. In some embodiments the lighting element 225 may indicate status information by being on, alternating between on and off ("flashing") at a constant rate, flashing at a rate based on network traffic, or changing colors. For example, the controller 205 may turn the lighting element 225 to an on state to indicate that the SE gateway 100 is mounted to the electrical outlet and receiving power but neither the SE network nor the external network has yet been detected by the controller 205. If the lighting element 225 is an LED, it may be pulsed at a rate that is visually undetectable to represent the on state. In another example, the controller 205 may flash the lighting element 225 when the SE gateway 100 joins either the SE network or the external network. In some embodiments the rate the lighting element 225 flashes may change depending on whether the SE gateway 100 has joined the SE network, the external network, or both. In some embodiments the controller 205 may flash the lighting element 225 to indicate an error state, or error code. For example, the lighting element 225 may be flashed three times to indicate error code no. 3, followed by a pause in the flashing. In some embodiments the lighting element 225 may flash to indicate the quality or "strength" of a signal. For example, if the SE network is a wireless network, the stronger the signal detected by the SE network module 215, the faster the lighting element 225 may flash.

In some embodiments, the controller 205 may control the lighting element 225 to display different colors to indicate status. In certain embodiments, the lighting element 225 displays different colors to indicate different error codes. In certain embodiments, the lighting element 225 may display different colors to indicate whether the SE gateway 100 has joined the SE network, the external network, or both (e.g., red to indicate the SE gateway 100 has not joined either network and green to indicate the SE gateway 100 has joined both the SE network and the external network).

A logical indication may provide an indication of SE gateway 100 status to someone located at the SE gateway 100 or to someone located remote from the SE gateway 100. An example of a logical indication includes the SE gateway 100 communicating status information with a separate communication device 245. In some embodiments, the controller 205 communicates information with the separate communication device 245 using either the SE network module 215 or the external network module 220. Examples of the communication device 245 may include a hand-held wireless communication device such as a personal data assistant ("PDA") used locally at the SE gateway 100. In some embodiments, the SE gateway 100 communicates status with the separate communication device 245 remotely, for example, using the SE network. Examples of a remote separate communication device 245 include a device communicating with a remote network node using a serial port, a server communicating with the SE network, or a remote gateway network. Further examples of the separate communication device 245 include a laptop computer, a desktop computer, a server, or a gateway network. The SE gateway 100 is able to communicate status at any time with the separate communication device 245.

In some embodiments the controller 205 may communicate information with the separate communication device 245 when the SE gateway 100 is mounted to the electrical outlet and receiving power. The SE gateway 100 then may or may not try to automatically join the SE network, or the external network, depending on its configuration settings.

In some embodiments the controller 205 may be configured to communicate information with the separate communication device 245 when the SE gateway 100 joins one, or both, of the SE network or the external network. However, if the configuration settings of the SE gateway 100 are not appropriate, the SE gateway 100 may need to be commissioned, or configured, by the separate communication device 245 in order to join the SE network or the external network. The separate communication device 245 may commission the SE gateway 100 by communicating configuration commands to the controller 205. When the SE gateway 100 joins the SE network, or the external network, the status may be viewed by the separate communication device 245 locally, or remotely via either the SE network or the external network.

In some embodiments, the controller 205 may communicate with the separate communication device 245 via an optional communication port 240. In some embodiments, the communication port 240 is an infrared ("IR") port and the controller 205 may communicate information wirelessly with the separate communication device 245 using IR signals. In some embodiments, the communication port 240 may be a serial port, such as a USB port for example, and the SE gateway 100 may communicate information with the separate communication device 245 using the serial port. The serial port may connect to the separate communication device 245 via a wire or cable or the serial port may be a wireless port.

In some examples, the SE gateway 100 may optionally include a switch 230, such as a push button, toggle, or dial, communicatively coupled to the controller 205. The controller 205 may be configured to initiate joining the SE network, the external network, or both when the switch 203 is activated. In some embodiments the switch 203 may have an inactive position, a position for joining both networks, a position for joining the SE network, a position for joining the external network, or any combination of these options. Someone deploying the mesh network may mount the SE gateway 100 on an electrical output to apply power to the SE gateway 100. The SE gateway 100 may then provide a physical or logical status indication that it has power. The switch 230 may then be activated initiating an attempt to join the SE network, the external network, or both. The SE gateway 100 may then provide a physical or logical status indication to indicate the status of the SE network, the external network, or both. In certain embodiments, activating the switch 203 places the SE device 100 in a reconfiguration mode and the separate communication device 245 may be used to reconfigure the SE gateway 100 at any time. In certain embodiments, activating the switch 230 may also reset the SE gateway 100, such as by holding down the switch 203 for at least a specific duration.

In some embodiments the SE gateway 100 may include a SE device 235. The SE device 235 may be a monitoring or control device on the SE network and comply with the standards of the SE network. For example, the SE device 235 may be a thermostat conforming to ZigBee Alliance's Smart Energy standard for thermostats. Other examples may include a utility meter, a motion sensor, and a smoke sensor among others.

It should be appreciated that the individual blocks within the block diagram do not necessarily correspond to discrete hardware structures. For example, some functionality of the SE network module 215 or the external network module 220 may be included in the controller 205.

As discussed previously with regard to FIG. 1, the SE gateway 100 is attachable to a power plug 105. In some embodiments, the SE gateway 100 includes a locking mechanism to secure the SE gateway 100 to an electrical outlet. This may help prevent theft if the SE gateway 100 is installed in a higher traffic area, such as a hospital or an industrial location for example. A locking mechanism also may improve reliability by preventing the SE gateway 100 from being maliciously, accidentally, or mistakenly unplugged.

Figure 3A:
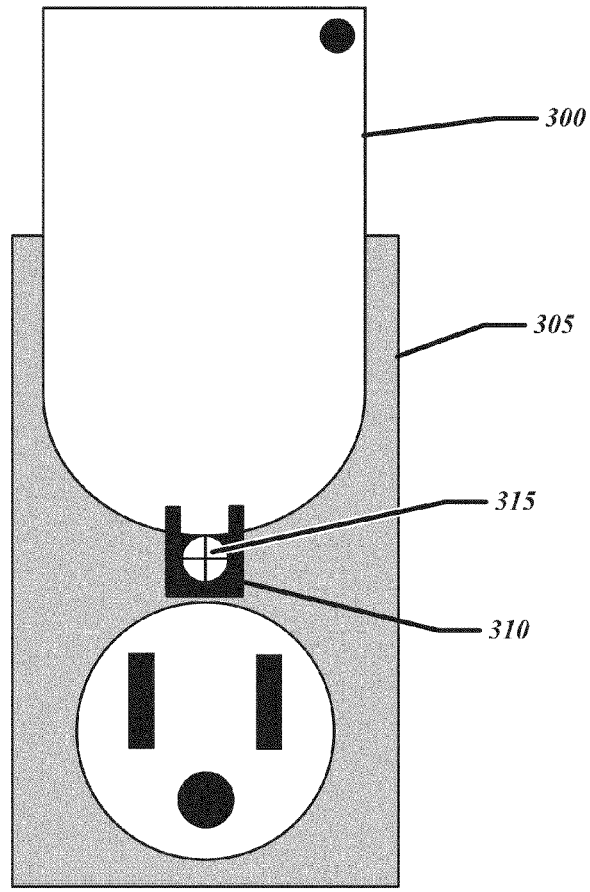
FIGS. 3a-b illustrate components involved in securing example SE gateways to an electrical outlet.
Figure 3B:
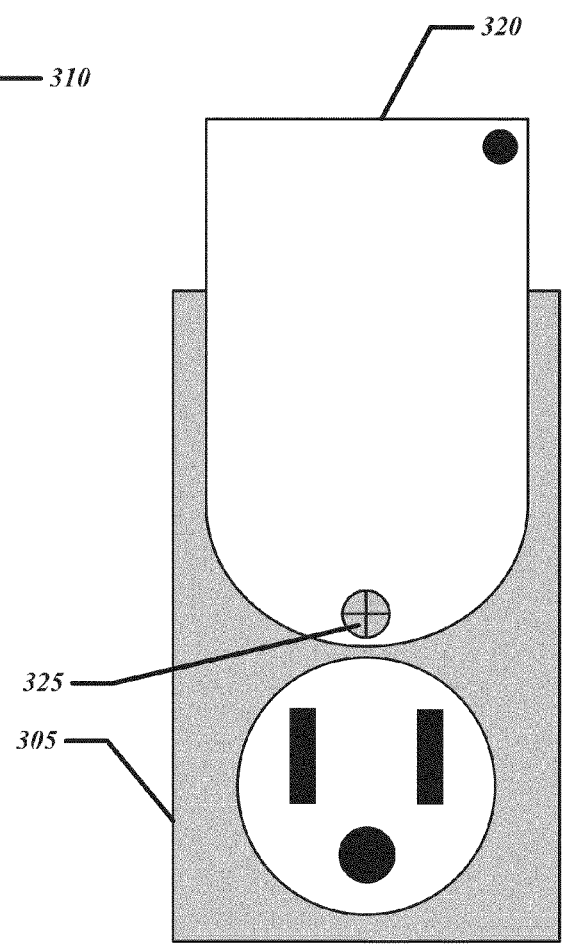

FIGS. 3a and 3b illustrate components involved in securing example SE gateways to an electrical outlet. In FIG. 3a a housing 300 of the SE gateway 100 may include a tab 310 that accepts a screw 315 to secure the SE gateway 100 to the faceplate 305 of the electrical outlet. The tab 310 may be located in other positions on the housing 300 to secure the SE gateway 100 to the faceplate 305. For example, the SE gateway 100 may be plugged into the lower outlet and the tab 310 may be located on the top of the housing 300. In FIG. 3b, another example housing 320 of a SE gateway 100 includes an opening to accept the screw 325 through the housing 320 itself to secure the SE gateway 100 to the faceplate 305 of the electrical outlet. In certain embodiments, the locking mechanism may include a bracket included on the faceplate 305 of the electrical outlet to secure the SE gateway 100 to the faceplate.

Figure 4A:
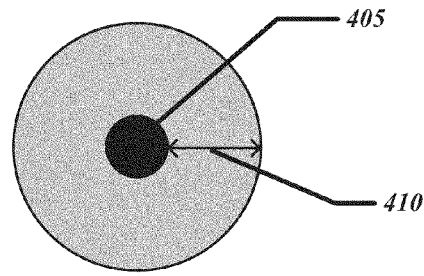
FIG. 4a illustrates an example node in a wireless mesh network.

FIG. 4a illustrates an example node 405 in a wireless mesh network. The smaller circle is the node 405 and the larger circle represents the wireless range 410 of the node 405. A node 405 may transmit data to other nodes within its range 410.

Figure 4B:
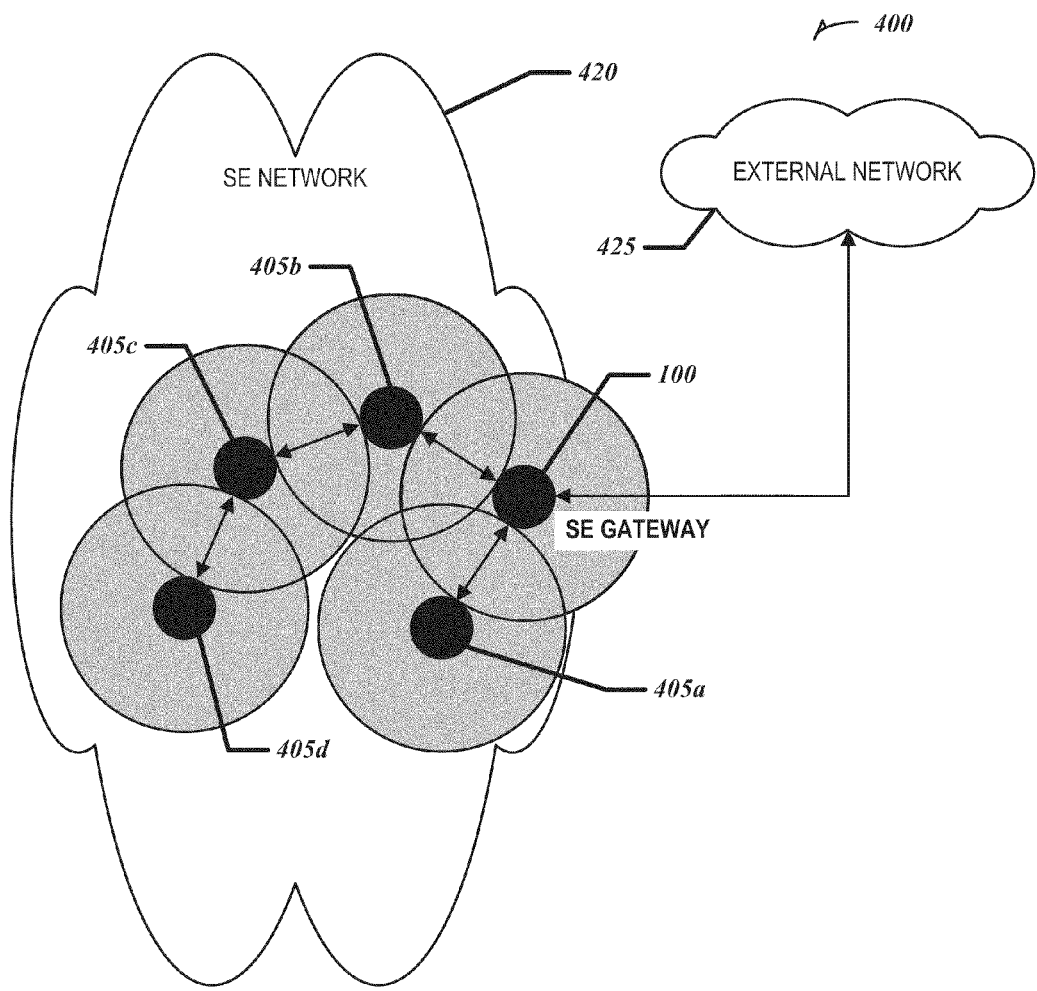
FIG. 4b illustrates an example SE network containing wireless mesh network nodes communicating with an external network.

FIG. 4b illustrates an example system 400 that may include a SE network 420 containing wireless mesh network nodes 405a-d and a SE gateway 100. The SE network 420 may be communicatively coupled with an external network 425.

In some embodiments the SE network 420 may be a mesh network formed by nodes 405a-c and the SE gateway 100. The following is an example of mesh network communication: if node 405c communicates with node 405a, the communication may be routed through node 405b and the SE gateway 100 to arrive at node 405a. The SE gateway 100 may facilitate the deployment of the SE network 420 by bridging the range gap between nodes 405a and 405b. Otherwise, node 405a may be isolated from the SE network 420 because its range 415 does not overlap another node 405. In some embodiments, deploying the SE gateway 100 in the SE network 420 may be assisted through physical or logical status indications initiated by the SE gateway 100. In other embodiments adding the SE gateway 100 to the SE network 420 may increase the performance of the SE network 420 by providing additional mesh network paths. In some embodiments the nodes 405a-d may be mesh network routers, SE devices, or other components of the SE network 420.

In some embodiments the SE gateway 100 may accept transmissions from one or more of nodes 405, a subset of those transmissions being addressed, or otherwise intended, for a device on the external network 425. The SE gateway 100 may then communicate the subset of transmissions to the external network 425. For example, if the SE network 420 uses a local addressing scheme for nodes 405, and node 405d attempts to communicate, for example, a gas meter reading to the gas utility company computer on the external network 425, then node 405d may transmit the reading to the SE gateway 100 which will then interface with the external network 425 and pass on the gas reading. In some examples the SE gateway 100 may provide services, such as network address translation, to allow a node 405 to receive a response from a device on the external network 425. In some embodiments the underlying interface between the SE gateway 100 and the external network 425 may be a wired connection, such as Ethernet, or a wireless connection, such as WiFi or cellular. The SE gateway 100 may reduce deployment costs by being located near its underlying connection to the external network 425. For example, locating the SE gateway near an existing Ethernet port may be easier than wiring a new Ethernet port. In another example, locating the SE gateway 100 near a window, or in a particular portion of a structure, may increase the reception of an underlying cellular connection to the external network 425.

Figure 5:
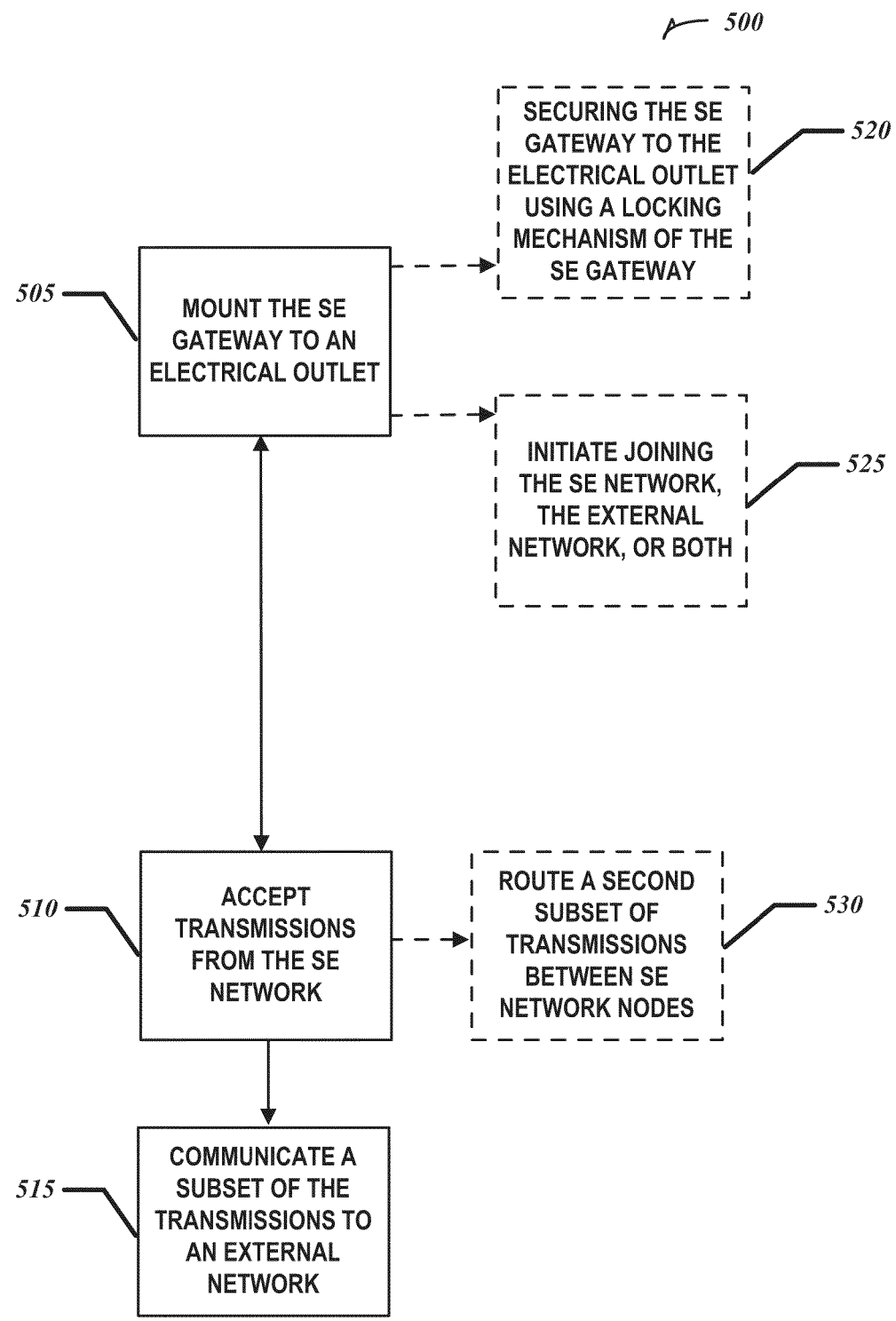
FIG. 5 illustrates a flow chart of an example method using a SE gateway with integrated plug.

FIG. 5 illustrates a flow chart of an example method 500 using a SE gateway with integrated plug.

At 505 the SE gateway 100 may be mounted to an electrical outlet and receive power from the electrical outlet.

At 520 the SE gateway 100 may be optionally secured to the electrical outlet using a locking mechanism, such as those shown in FIGS. 3a and 3b. Securing the SE gateway 100 to the electrical outlet may increase the security of the SE gateway 100 from thieves, or simply help to prevent accidental power interruption by, for example, something knocking the SE gateway 100 out of the electrical outlet in a high traffic area.

At 525 SE gateway 100 may optionally attempt to join the SE network 420, the external network 425, or both when it receives power. In other embodiments the SE gateway 100 may await a command or other condition, such as receiving a configuration for the SE network 420, the external network 425, or both. In some embodiments the SE gateway 100 may await activation via an included switch 230. For example, a person may deploy the SE gateway 100 and then actuate the switch 230 to initiate joining the SE network 420. In some embodiments, the switch 230 may allow an operator to select among different functions, such as, for example, resetting the SE gateway 100, joining only one of the networks, or joining both the SE network 420 and the external network 425 simultaneously.

At 510, after the SE gateway 100 has joined the SE network 420, the SE gateway 100 may accept transmissions from nodes 405 on the SE network 420. In some embodiments the SE gateway 100 may transmit data on the SE network 420, such, for example, monitoring data from an optionally included SE device 235.

At 530 the SE gateway 100 optionally routes a subset of the transmissions between nodes 405 on the SE network 420—this subset of transmissions being addressed to, or otherwise designated for, a node 405 in the SE network 420. The SE gateway 100 may then be a mesh network router allowing the SE network 420, if it is a mesh network, to be extended or strengthened by adding mesh network pathways.

At 515, after the SE gateway 100 has joined the external network 425, the SE gateway 100 may communicate a subset of the transmissions to the external network 425. For example, If node 405c is a SE thermostat configured to periodically communicate a home's temperature to a website that the owner may view, node 405c may simply address the transmission to the website and send it through the SE network 420 to the SE gateway 100. The SE gateway 100 may then resolve the external network 425 address of the website and communicate the temperature reading to the website. In some embodiments the SE gateway 100 may also perform network services, such as network address translation, to allow the website to respond to node 405c's original transmission even though node 405c's address may not be accessible to the website.

Figure 6:
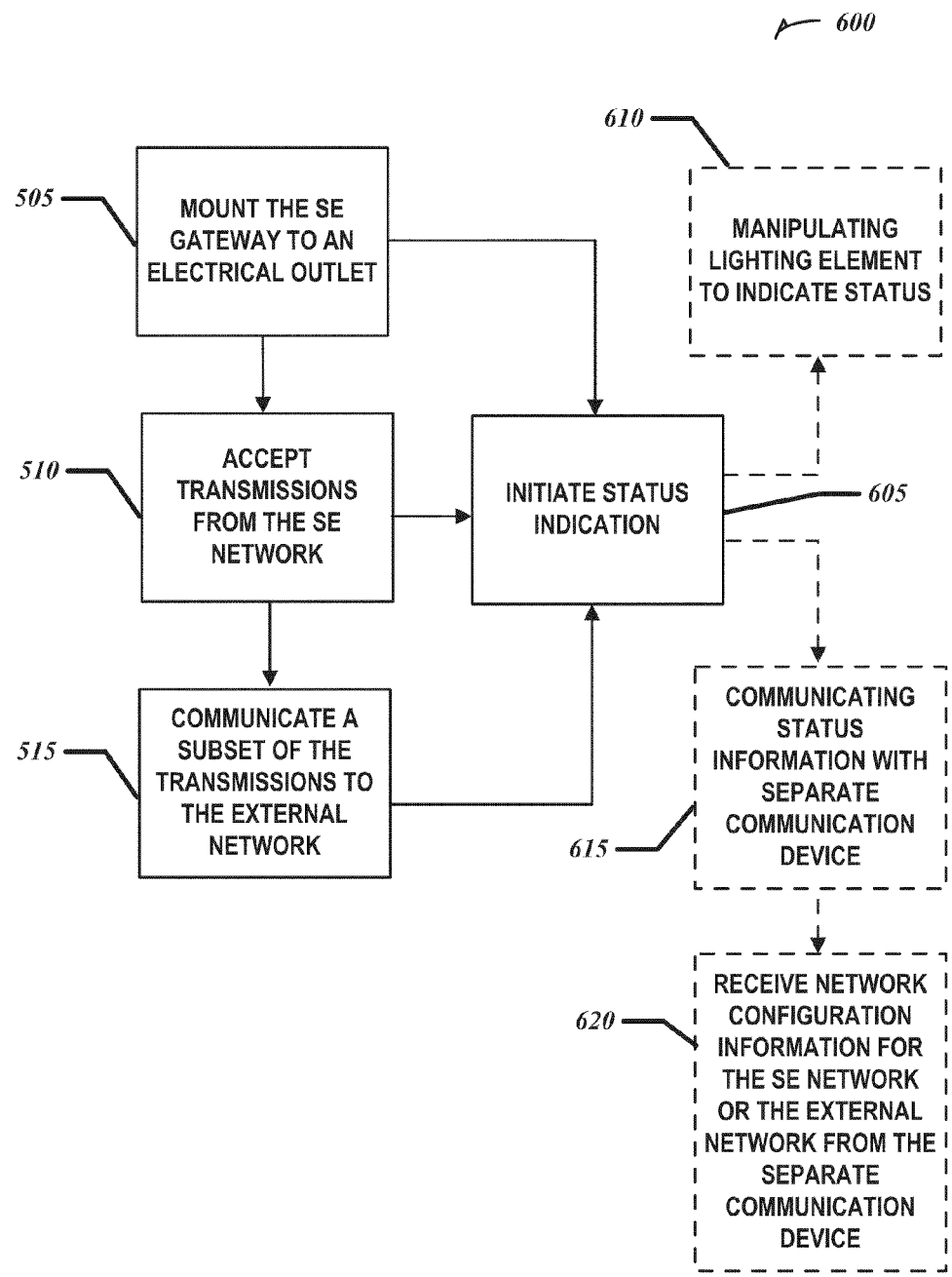
FIG. 6 illustrates a flow chart of another example method of using a SE gateway with integrated plug.

FIG. 6 illustrates a flow chart of another example method 600 of using a SE gateway with integrated plug. In this example, method 500 may be further extended as described below.

At 605 the SE gateway 100 may initiate a status indication based on the actions of 505, 510, 515, or any combination of the three. For example, the status indication based on 505 may indicate that the SE gateway 100 has been mounted to an electrical outlet and is receiving power. In another example, the status indication based on 505 may indicate that the SE gateway 100 has joined the SE network 420, the external network 425, or has joined both or neither network. In still another example, the status indication based on 510 may indicate the strength of the network connection with the SE network 420, or may indicate data received and sent to and from the SE network 420. In an additional example, the status indication based on 515 may indicate the strength of the network connection—where appropriate, e.g., if the external network 425 is wireless such as WiFi or cellular—with the external network 425, or it may indicate data received and sent to and from the external network 425.

At 610 the status indication may optionally be a physical indication visible to one proximately located to the SE gateway 100. In some embodiments the SE gateway 100 may manipulate an integrated lighting element 225. Manipulating the lighting element 225 may involve turning it on, varying its color, or flashing it. In some embodiments the lighting element 225 may be flashed at a constant rate, the rate varying to indicate different conditions. For example, the lighting element 225 may flash slowly to indicate that the SE gateway 100 has power, faster to indicate that the SE gateway 100 has joined the SE network 420, and faster yet to indicate that the SE gateway 100 has also joined the external network 425. The lighting element 225 may also change color or flash to indicate an error condition or code. For example, the lighting element 225 may turn red to indicate an error and flash four times to indicate error code no. 4.

At 615 the status indication may optionally be a logical indication, readable by a separate communication device 245. As described above with regard to FIG. 2, the SE gateway 100 may communicate the logical indication via several mechanisms to the separate communication device 245.

At 620 the SE gateway 100 may receive network configuration information for the SE network 420, the external network 425, or both from the separate communication device 245. The separate communication device 245 may communicate the network configuration information in response to the logical indication. For example, if the status indication is that the SE gateway 100 is mounted to the electrical outlet and receiving power, the separate communication device 245 may receive the indication logically and transmit the configuration information to the SE gateway 100. In some embodiments the separate communication device 245 sends network configuration information to the SE gateway at any time.

Integrating a plug into a smart energy gateway may ease the deployment of the smart energy gateway in a smart energy network by providing a compact and robust package with sufficient power at any one of many conveniently located electrical outlets. The convenience of placing the smart energy gateway at an electrical outlet is increased when factors such as access to the external network are considered. Additionally, the status indications of the smart energy gateway may ease the positioning of the smart energy gateway to better serve the smart energy network, especially if it is a wireless mesh network, or to better connect to the external network if it is a wireless network.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a tangible computer-readable medium or tangible machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A smart energy (SE) gateway comprising:
 a housing;
 a power plug integrated into the housing, wherein the SE gateway can be mounted to an electrical outlet via the power plug and wherein the SE gateway receives power through the power plug; and
 a controller configured to operate as an SE network gateway for an SE network including being configured to:
  accept transmissions from a node in the SE network;
  communicate a first subset of the transmissions to an external network node in an external network, wherein the first subset of the transmissions address the external network node, wherein the SE network and the external network are distinct logical networks; and
  route a second subset of the transmissions between nodes on the SE network.

2. The SE gateway of claim 1, wherein the SE network is a wireless mesh network; and wherein the controller is configured to accept the transmissions from the SE network when the SE gateway joins the wireless mesh network.

3. The SE gateway of claim 2, wherein the wireless mesh network is a ZigBee protocol network.

4. The SE gateway of claim 2, wherein the wireless mesh network implements an IEEE 802.15.4 communication protocol standard for wireless personal area networks (WPANs).

5. The SE gateway of claim 1, wherein the external network is an Ethernet network.

6. The SE gateway of claim 1, wherein the external network is a WiFi network.

7. The SE gateway of claim 1, wherein the external network is a cellular network.

8. The SE gateway of claim 1, wherein the SE gateway includes a locking mechanism to secure the SE gateway to the electrical outlet.

9. The SE gateway of claim 1, wherein the controller is further configured to initiate a status indication based on at least one of the SE gateway being mounted to the electrical outlet, the SE gateway being joined to the SE network, or the SE gateway being joined to the external network.

10. The SE gateway of claim 9, wherein the SE gateway includes a lighting element coupled to the controller; and wherein to initiate the status indication includes manipulating the lighting element.

11. The SE gateway of claim 10, wherein manipulating the lighting element includes at least one of setting the lighting element to an on state, alternating the lighting element between on and off states at a constant rate, alternating the lighting element between on and off states at a rate according to a network connection status, or changing the lighting element's color.

12. The SE gateway of claim 10, wherein the lighting element comprises at least one light emitting diode (LED).

13. The SE gateway of claim 9, wherein the status indication includes communicating at least one of power-up status information, SE network status information, or external network status information to a separate communication device.

14. The SE gateway of claim 13, wherein communicating power-up status information with the separate communication device includes receiving at least one of SE network configuration information or external network configuration from the separate communication device.

15. The SE gateway of claim 13, wherein the SE gateway includes a communication port communicatively coupled to the controller; and wherein the communicating with the separate communication device is via the communication port.

16. The SE gateway of claim 1, wherein the controller is further configured to initiate joining at least one of the SE network or the external network when the SE gateway is activated.

17. The SE gateway of claim 16, wherein the SE gateway is activated when a switch on the SE gateway is actuated.

18. The SE gateway of claim 1, wherein the SE gateway includes a SE device in the housing.

19. The SE gateway of claim 1, wherein the power plug is interchangeable.

20. In a system having a smart energy (SE) gateway with a power plug integrated into a housing of the SE gateway and communicatively coupled to a SE network and an external network, a method comprising:
 mounting, using the power plug, the SE gateway to an electrical outlet;
 accepting, using the SE gateway, transmissions from a node in the SE network; and
 communicating, using the SE gateway, a first subset of the transmissions to an external network node in the external network, wherein the subset of the transmissions address the external network node, and wherein the SE network and the external network are distinct logical networks; and
 routing, a second subset of the transmissions between nodes on the SE network.

21. The method of claim 20, wherein the SE network is a wireless mesh network; and wherein the transmissions are accepted when the SE gateway joins the wireless mesh network.

22. The method of claim 21, wherein the wireless mesh network is a ZigBee protocol network.

23. The method of claim 21, wherein the wireless mesh network implements an IEEE 802.15.4 communication protocol standard for wireless personal area networks (WPANs).

24. The method of claim 20, wherein the external network is an Ethernet network.

25. The method of claim 20, wherein the external network is a WiFi network.

26. The method of claim 20, wherein the external network is a cellular network.

27. The method of claim 20, wherein the mounting includes securing the SE gateway to the electrical outlet using a locking mechanism of the SE gateway.

28. The method of claim 20, further comprising initiating a status indication based on at least one of the SE gateway being mounted to the electrical outlet, the SE gateway being joined to the SE network, or the SE gateway being joined to the external network.

29. The method of claim 28, wherein initiating the status indication includes manipulating a lighting element of the SE gateway.

30. The method of claim 29, wherein manipulating the lighting element includes at least one of setting the lighting element to an on state, alternating the lighting element between on and off states at a constant rate, alternating the lighting element between on and off states according to a network connection status, or changing the lighting element's color.

31. The method of claim 29, wherein the lighting element comprises at least one light emitting diode (LED).

32. The method of claim 28, wherein the status indication includes communicating at least one of power-up status information, SE network status information, or external network status information to a separate communication device.

33. The method of claim 32, wherein communicating power-up status information with the separate communication device includes receiving at least one of SE network configuration information or external network configuration from the separate communication device.

34. The method of claim 32, wherein communicating to the separate communication device includes using a communication port of the SE gateway.

35. The method of claim 20, wherein mounting the SE gateway to the electrical outlet includes activating the SE gateway and initiate joining at least one of the SE network or the external network when the SE gateway is activated.

36. The method of claim 35, wherein activating the SE gateway includes actuating a switch of the SE gateway.

37. The method of claim 20, further comprising generating SE network transmissions from a SE device of the SE gateway.

* * * * *

UNITED STATES PATENT AND TRADEMARK OFFICE
CERTIFICATE OF CORRECTION

| | |
|---|---|
| PATENT NO. | : 8,578,001 B2 |
| APPLICATION NO. | : 12/823333 |
| DATED | : November 5, 2013 |
| INVENTOR(S) | : Young et al. |

It is certified that error appears in the above-identified patent and that said Letters Patent is hereby corrected as shown below:

On the Title page, item (75) Inventors, replace "Mark Tekippe, Story City, IA (US)" with --Mark Tekippe, St. Paul, MN (US)--

Signed and Sealed this
Twenty-third Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,578,001 B2 | Page 1 of 1 |
| APPLICATION NO. | : 12/823333 | |
| DATED | : November 5, 2013 | |
| INVENTOR(S) | : Young et al. | |

It is certified that error appears in the above-identified patent and that said Letters Patent is hereby corrected as shown below:

In the Claims

At Column 12, Line 51, replace "routing, a second subset" with --routing, using the SE gateway, a second subset--

Signed and Sealed this
Fourth Day of November, 2014

Michelle K. Lee
*Deputy Director of the United States Patent and Trademark Office*